United States Patent [19]

Carter

[11] Patent Number: 4,464,886
[45] Date of Patent: Aug. 14, 1984

[54] MULTIBLADE ROTARY LAWNMOWER

[76] Inventor: Joseph F. Carter, 567 Tremont St., Rehoboth, Mass. 02967

[21] Appl. No.: 151,424

[22] Filed: May 19, 1980

[51] Int. Cl.³ .................................. A01D 35/264
[52] U.S. Cl. .................................. 56/13.8; 56/255
[58] Field of Search ..................... 56/13.6–13.8, 56/255, 6

[56] References Cited

U.S. PATENT DOCUMENTS 1,656,105  1/1928  Durkee .................. 56/13.6
2,956,386  10/1960  Niemann ................ 56/13.8
3,068,631  12/1962  Pegnani ................. 56/13.6

Primary Examiner—J. N. Eskovitz
Attorney, Agent, or Firm—Salter & Michaelson

[57] ABSTRACT

A multiblade rotary lawnmower is disclosed that includes a pair of rotary blade members that are located in tandem relation but are disposed such that the swath of cut of the rear blade member overlaps with the swath of cut of the forward blade member, the rear blade member also fine cutting the area that is first cut by the first blade member and further mulching the grass and vegetation as cut thereby.

3 Claims, 4 Drawing Figures

MULTIBLADE ROTARY LAWNMOWER

BACKGROUND OF THE INVENTION

Multiblade rotary lawnmowers have been known and well used heretofore, although such lawnmowers have normally included rotary blades that were located in side-by-side relation that enlarged the total swath of lateral cut by the lawnmower in the operation thereof. Such rotary lawnmowers that included the side-by-side rotary blades are illustrated in the following U.S. Pat. Nos.: FAHNESTOCK, 2,188,110; LEE, 2,504,268; FLINCHBAUGH, 2,763,116; BUSH, 2,815,634; JEPSON, 2,926,478; and DOI, 4,090,346.

As illustrated in the aforesaid U.S. patents, the rotary lawnmowers described therein included rotary blades that were driven by a common drive shaft, the rotary blades being normally disposed in side-by-side lateral relation and the shafts on which the blades were mounted being spaced apart on a support for locating the rotary blades in their side-by-side lateral relationship. Although these prior known constructions did accomplish the purpose intended, that is, to provide an extended swath of lateral cut for the lawnmower during the operation thereof, the dual blades as employed in these prior known lawnmowers each performed the same function of cutting a separate area of grass or vegetation as the mower passed thereover.

In many instances when the grass to be cut has overgrown to some extent, it is necessary to fine cut after the primary pass over the lawn has been made by the mower. In such instances it is desirable to provide a simultaneous first and second cut of grass in a single pass of the lawnmower, the second cut not only fine-cutting the grass, but also mulching the grass into fines that to a great extent avoids the requirement of sweeping or collecting of the cut grass after mowing.

Prior to the instant invention, some efforts have been made to provide tandem blades in a lawnmower to effect a mulching action, one such construction being illustrated in the patent to NIEMAN, U.S. Pat. No. 2,956,386. However, even in the lawnmower illustrated in the NIEMAN patent, the mulching blades were disposed in multilevels relative to the forward cutting blade, and fine cutting of the cut grass could not be achieved.

As will be set forth hereinafter, the present invention avoids the traditional problems experienced with the usual rotary lawnmower that can effect only a single cut and that has not been provided with any effective means for fine cutting the grass after the original cut thereof or for simultaneously mulching or comminuting the cut grass.

The above-referred to patents represent the best prior art known to applicant to which the invention pertains, and reference thereto constitutes applicant's prior art statement.

SUMMARY OF THE INVENTION

The present invention relates to a multiblade rotary lawnmower and includes a frame on which wheels are operatively mounted for supporting the frame above the surface over which the lawnmower travels. Located beneath the frame and mounted for rotary movement is a first elongated blade member. Spaced rearwardly of the first elongated blade member in tandem relation is a second elongated blade member that is also mounted for rotation beneath the frame, the blade members being disposed in substantially the same horizontal plane. The blade members are located relative to each other such that the longitudinal axes thereof are disposed in perpendicular relation, the blades also being located in overlapping relation such that the swath of cut from the blade members overlap upon forward movement of the lawnmower. The tandem positioning of the blade members provides for the fine cutting of grass by the second blade member in that area that is first cut by the first blade member, the second blade member further finely comminuting and mulching the grass to avoid the sweeping thereof after the cutting operation.

Accordingly, it is an object of the present invention to provide a multiblade rotary lawnmower that includes a pair of overlapping blade members that are located in tandem relation but that are disposed such that the swath of cut of the rear blade member overlaps with the swath of cut of the forward blade member, wherein the rear blade member fine-cuts the area that is first cut by the forward blade member.

Other objects, features and advantages of the invention shall become apparent as the description thereof proceeds when considered in connection with the accompanying illustrative drawings.

DESCRIPTION OF THE DRAWING

In the drawing which illustrates the best mode presently contemplated for carrying out the present invention.

DESCRIPTION OF THE INVENTION

Figure 1:
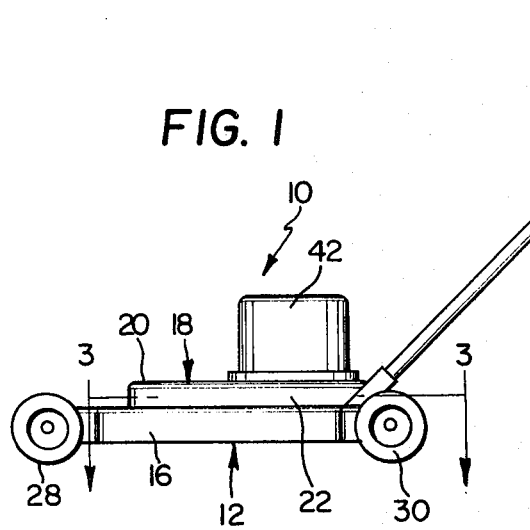
FIG. 1 is a side elevational view of the multiblade rotary lawnmower embodied in the subject invention.
Figure 2:
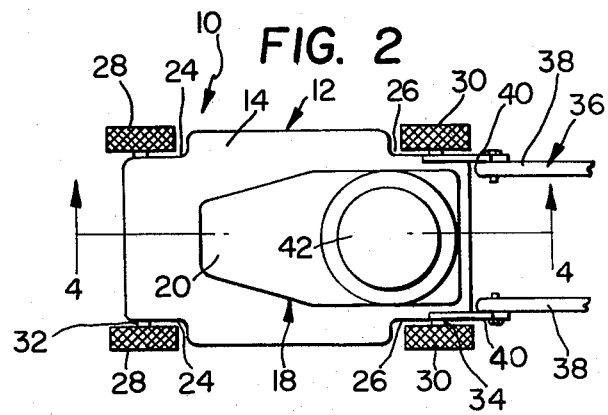
FIG. 2 is a top plan view thereof.

Referring now to the drawing and particularly to FIGS. 1 and 2, the multiblade rotary lawnmower embodied in the present invention is illustrated and is generally indicated at 10. The lawnmower 10 is generally of conventional construction with respect to the exterior appearance thereof and includes a frame 12 that is defined by a top wall 14 and a downwardly extending flange or side wall 16. Mounted on the top wall 14 of the frame 12 is a gear housing generally indicated at 18 that includes an upper wall 20 and vertical side walls 22, the gear housing 18 enclosing the driving mechanism for the blade members of the lawnmower, as will be described hereinafter.

As illustrated in FIG. 2 the frame 12 is formed with notches 24 and 26 at the front and rear ends respectively, the notches 24 and 26 accommodating front wheels 28 and rear wheels 30 that are rotatably mounted on axles 32 and 34 respectively. The axles 32 and 34 are journalled in the side walls 16 of the frame 12, the wheels 28 and 30 that are mounted thereon supporting the frame 12 above the surface over which the lawnmower 10 travels.

Interconnected to the rear of the frame 12 in pivotal relation with respect thereto is a U-shaped handle generally indicated at 36 that is of any conventional construction. As illustrated in FIG. 2, the U-shaped handle 36 includes arms 38 that are pivotally connected to rearwardly extending brackets 40 that are directly joined to the frame 12 adjacent to the rear wheels 30.

Figure 4:
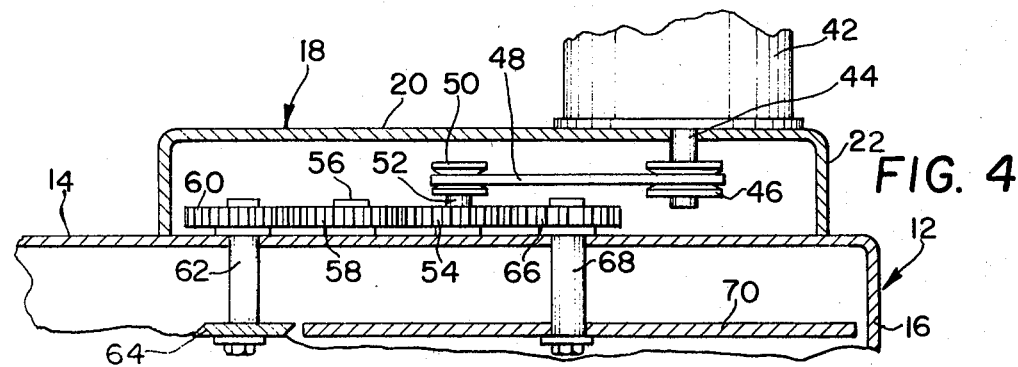
FIG. 4 is a sectional view taken along line 4—4 in FIG. 2.

Referring now to FIG. 4, a motor 42 is shown mounted on the rear housing 18, and although the motor 32 as illustrated is an electric motor, it is understood that it may also be an internal combustion engine of any conventional design. Extending downwardly from the motor 32 through an opening in the top wall 20 of the gear housing 18 is a drive shaft 44 on the lowermost end of which a pulley 46 is secured. A drive belt 48 such as a timing belt interconnects the pulley 36 and a driven reduction pulley 50 that is mounted on a shaft 52, the shaft 52 being journalled for rotation in the top wall 14 of the frame 12. Fixed to the shaft 52 for rotation therewith is a drive gear 54 of predetermined diameter which upon rotation of the drive shaft 44 will provide for a corresponding rotation of the rotary blades as will be described.

Also mounted on the top wall 14 of the frame 12 is an idler shaft 56 that has an idler gear 58 mounted thereon. Engaging the idler gear 56 is a forward driven gear 60 that is mounted on a forward blade member shaft 62. Thus it is seen that upon rotation of the drive gear 54 the forward driven gear 60 and shaft 62 that is journalled for rotation in the top wall 14 of the frame 12 are rotated therewith. Further, the gears 54, 58 and 60 all have a 1:1 ratio so that the rotational or angular velocity of the drive gear 54 is directly translated to the forward driven gear 60 and the shaft 62 on which it is mounted. Fixed to the lowermost end of the blade member shaft 62 is a forward blade member 64 that defines the forward cutting blade of the lawnmower during the cutting operation. As illustrated the blade member 64 is of conventional design, but it is understood that the blade member 64 may be formed in any convenient design or configuration utilized for lawnmower rotary blades.

Engaging the drive gear 54 and located rearwardly thereof is a rearward driven gear 66 that is mounted on a blade member shaft 68, the blade member shaft 68 being also journalled for rotation in the top wall 14 of the frame 12. Fixed to the lower end of the blade member shaft 68 is a rear blade member 70 that is similar in design and configuration to the blade member 64, the longitudinal axis of the blade member 70 being permanently disposed in perpendicular relation with respect to the longitudinal axis of the blade member 64. The shaft 68 and the blade member 70 mounted thereon are also rotated in counter rotation relative to the shaft 62 and the blade member 64 fixed thereto.

Figure 3:
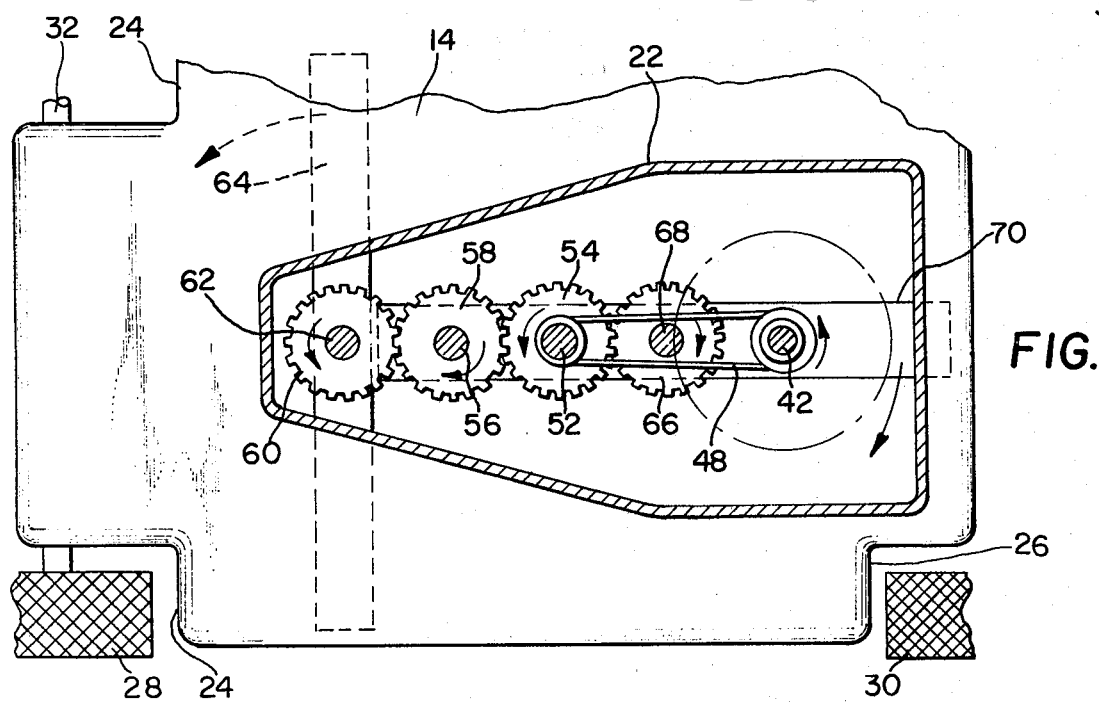
FIG. 3 is a sectional view taken along line 3—3 in FIG. 1.

As illustrated more clearly in FIG. 3, the location of the shafts 62 and 68 that carry the blade members 64 and 70 respectively, and the longitudinal dimensions of the blade members, locates and provides for an overlapping of the cutting areas of the blade members as the mower moves forwardly. However, since the idler gear 58 and driven gears 60 are directly driven by the drive gear 54 and have a 1:1 ratio therewith, the longitudinal axes of the blade members 64 and 70 will always remain 90° removed from each other and the swath of cut of each blade member will therefore overlap during the forward movement or travel of the lawnmower over the lawn surface to be cut.

In operation of the machine, the operator either manually pushes the lawnmower forwardly, or in the event a self-propelled unit is included or incorporated in the lawnmower, the lawnmower is self-propelled in a forwardly direction during the operation thereof. As the lawnmower moves forwardly, the forward blade member 64 rough cuts the grass in the circular or rotary movement thereof. Since the rear blade member 70 defines a cutting path or swath that overlaps the area as cut by the forward blade member 64, the rear blade member fine-cuts or comminutes the grass as the lawnmower travels forwardly. This fine cutting by the rear blade member 70 is achieved since the blade members 64 and 70 are disposed in the same horizontal plane. Thus, as the blade member 64 performs the initial cutting operation upon the forward movement of the mower, the blade member 70 immediately following thereafter in the same horizontal plane not only finecuts the grass or vegetation as first cut by the forward blade member but further comminutes or mulches the grass as first cut by the blade member 64.

It is also seen that the blade member 70 rotates in an opposite direction with respect to the blade member 64, this opposite rotation of the blade members further enabling the rearward blade member 70 to effect a finecut of the grass and to further mulch or comminute the grass already cut by the forward blade member. Since the blade members are operated from the drive gear 54 on a 1:1 ratio, they are constantly and positively driven at the same angular velocity which insures that they will always retain their angular relationship with respect to each other. Further, the location of the blade members in the same horizontal plane insures that the grass cut by the forward blade member will be fine-cut to a constant level. This cutting action of the rear blade member therefore provides that the grass will be cut at a distinct vertical dimension which will not only render the lawn that is cut more appealing in appearance, but will further insure even growth of the grass as cut. Thus, as the grass grows after the cutting operation an even overall appearance is achieved that provides an unusually attractive appearance for the lawn. Lastly, the even cutting of the grass as insured by the tandemly located rear blade member 70 actually promotes more effective growth of the grass after the cutting operation.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A multiblade rotary lawnmower for cutting vegetation, comprising a frame, wheels operatively mounted on said frame adjacent to the front and rear thereof for moving said frame in a forwardly direction and for supporting said frame above the surface over which said lawnmower travels, a first elongated blade member mounted for rotation beneath said frame and spaced upwardly from said surface, a second elongated blade member mounted for rotation below said frame and adjacent to and directly behind said first blade member and in substantially the same horizontal plane thereof, spaced vertical shafts mounted on said support, each of said blade members being secured to a vertical shaft for rotation thereby, said shafts and blade members secured thereto being disposed in spaced tandem aligned relation, the longitudinal axis of said second blade member being disposed at 90° in angular relation with respect to the longitudinal axis of said second blade member, said vertical shafts on which said blade members are mounted being located relative to each other such that when the blade members are disposed at right angles to each other, an outer end of one blade member is located in close adjacent relation with respect to a longitudinal edge of the other blade member, wherein the blade members closely overlap in the rotating movement thereof, so that the swath of said vegetation as cut by said first blade members is continuously fine-cut by said second blade member upon forward movement of said lawnmower, the length of each blade member being slightly less than the width of the frame on which said blade members are mounted, so that the swath of cut of each blade member is substantially the same as the width of the said frame, and means mounted on said frame and interconnected to said vertical shafts for rotating said shafts and the blade members interconnected thereto at the same angular velocity and in opposite directions.

2. A multiblade rotary lawnmower as claimed in claim 1, said rotating means including a motor mounted on said frame, a drive shaft drivingly interconnected to said motor, a drive gear interconnected to said drive shaft, blade member gears mounted on said blade shafts and being interconnected to said drive gear, said blade member gears and drive gear having a 1:1 ratio.

3. A multiblade rotary mower as claimed in claim 1, an idler pinion gear being located between said drive gear and the blade member gear that is mounted on the shaft that carries said first blade member, said drive gear directly engaging the blade member gear that is mounted on the shaft that carries said second blade member.

* * * * *